(12) United States Patent
Furutani et al.

(10) Patent No.: US 10,475,479 B2
(45) Date of Patent: Nov. 12, 2019

(54) HEAD GIMBAL ASSEMBLY AND MAGNETIC DISK DEVICE WITH THE SAME WITH SLIDER HAVING INTERMITTENT CAPTURE GROOVES

(71) Applicants: Kabushiki Kaisha Toshiba, Minato-ku, Tokyo (JP); Toshiba Electronic Devices & Storage Corporation, Minato-ku, Tokyo (JP)

(72) Inventors: Kazuhiro Furutani, Yokohama Kanagawa (JP); Toru Watanabe, Kawasaki Kanagawa (JP); Masami Yamane, Kawasaki Kanagawa (JP); Kan Takahashi, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/055,459

(22) Filed: Aug. 6, 2018

(65) Prior Publication Data
US 2019/0259420 A1    Aug. 22, 2019

(30) Foreign Application Priority Data
Feb. 22, 2018  (JP) .................. 2018-030042

(51) Int. Cl.
*G11B 5/60* (2006.01)
*G11B 33/14* (2006.01)
*G11B 21/21* (2006.01)

(52) U.S. Cl.
CPC .......... *G11B 5/6082* (2013.01); *G11B 5/6064* (2013.01); *G11B 21/21* (2013.01); *G11B 33/1446* (2013.01)

(58) Field of Classification Search
None
See application file for complete search history.

(56) References Cited

U.S. PATENT DOCUMENTS

| 6,055,127 | A | 4/2000 | Boutaghou et al. |
| 7,005,127 | B2 | 2/2006 | Song et al. |
| 8,203,805 | B2 | 6/2012 | Huang et al. |
| 2008/0259499 | A1* | 10/2008 | Hu et al. .............. G11B 5/6005 360/235.4 |

(Continued)

FOREIGN PATENT DOCUMENTS

| JP | 2009-110618 A | 5/2009 |
| JP | 2009-116062 A | 5/2009 |
| JP | 2014-116062 A | 6/2014 |

*Primary Examiner* — Craig A. Renner
(74) *Attorney, Agent, or Firm* — White & Case LLP

(57) ABSTRACT

According to one embodiment, a head gimbal assembly includes a suspension and a magnetic head supported by the suspension via a gimbal portion. The magnetic head includes a slider and a head portion in the slider. The slider includes an air bearing surface, a pair of side surfaces, a leading-side end surface, and a trailing-side end surface. The slider includes a deep groove which is formed between a leading-side step portion and a trailing-side step portion and is open to the air bearing surface and the pair of side surfaces, and at least a pair of capturing grooves which is formed on a bottom surface of the deep groove. The capturing grooves are provided along the pair of side surface and are placed with a gap from the pair of side surfaces.

6 Claims, 8 Drawing Sheets

(56) References Cited

U.S. PATENT DOCUMENTS

| | | | |
|---|---|---|---|
| 2008/0259501 A1* | 10/2008 | Hu et al. | G11B 5/6005 360/235.7 |
| 2009/0109572 A1 | 4/2009 | Watanabe | |
| 2009/0141403 A1* | 6/2009 | Hu et al. | G11B 5/6005 360/235.7 |
| 2010/0103560 A1 | 4/2010 | Imamura et al. | |
| 2011/0032641 A1* | 2/2011 | Ookubo et al. | G11B 5/6005 360/235.5 |
| 2014/0192440 A1 | 7/2014 | Rajasekharan et al. | |
| 2018/0068687 A1* | 3/2018 | Yamane | G11B 5/6082 |

* cited by examiner

HEAD GIMBAL ASSEMBLY AND MAGNETIC DISK DEVICE WITH THE SAME WITH SLIDER HAVING INTERMITTENT CAPTURE GROOVES

CROSS-REFERENCE TO RELATED APPLICATIONS

This application is based upon and claims the benefit of priority from Japanese Patent Application No. 2018-030042, filed Feb. 22, 2018, the entire contents of which are incorporated herein by reference.

FIELD

Embodiments described herein relate generally to a head gimbal assembly and a magnetic disk device with the same.

BACKGROUND

A magnetic disk device, for example, a hard disk drive (HDD) comprises a magnetic disk which is rotatably provided and a head gimbal assembly. The head gimbal assembly comprises a suspension having a gimbal portion and a magnetic head supported by the gimbal portion.

The magnetic head includes a slider and a head portion provided on the slider. The head portion includes a read element for read and a recording element for write. The slider includes a facing surface (Air Bearing Surface: ABS) which faces a recording layer of the magnetic disk. The ABS includes one or more positive pressure generating surfaces on an upstream side (inflow side) and a downstream side (outflow side) and at least a pair of negative pressure generating grooves on the downstream side. In addition, the ABS has a groove portion lower than the pressure generating surface between a pressure generating surface on an inflow side and a pressure generating surface on an outflow side, and the groove portion is formed on the same surface up to the side portion of the slider.

During an operation of a disk drive, an air flow is generated between the rotating magnetic disk and the slider, and the ABS of the slider is subjected to a force (positive pressure) which flies the slider from a magnetic disk recording surface according to a principle of air fluid lubrication. By balancing the flying force and a head load, the slider flies with a gap from the magnetic disk recording surface.

Although the disk drive is kept at a higher cleanliness, there is contamination such as a small amount of dust or dirt in the drive. Liquid contamination such as a lubricant is mainly stored in a groove of the ABS and flows to the side portion of the slider. The liquid contamination reaching the side portion flows to the downstream side of the magnetic head and finally falls onto the magnetic disk. As a result, a gap between the magnetic head and the magnetic disk is changed, which may adversely affect the magnetic head or the magnetic disk.

DETAILED DESCRIPTION

Figure 1:
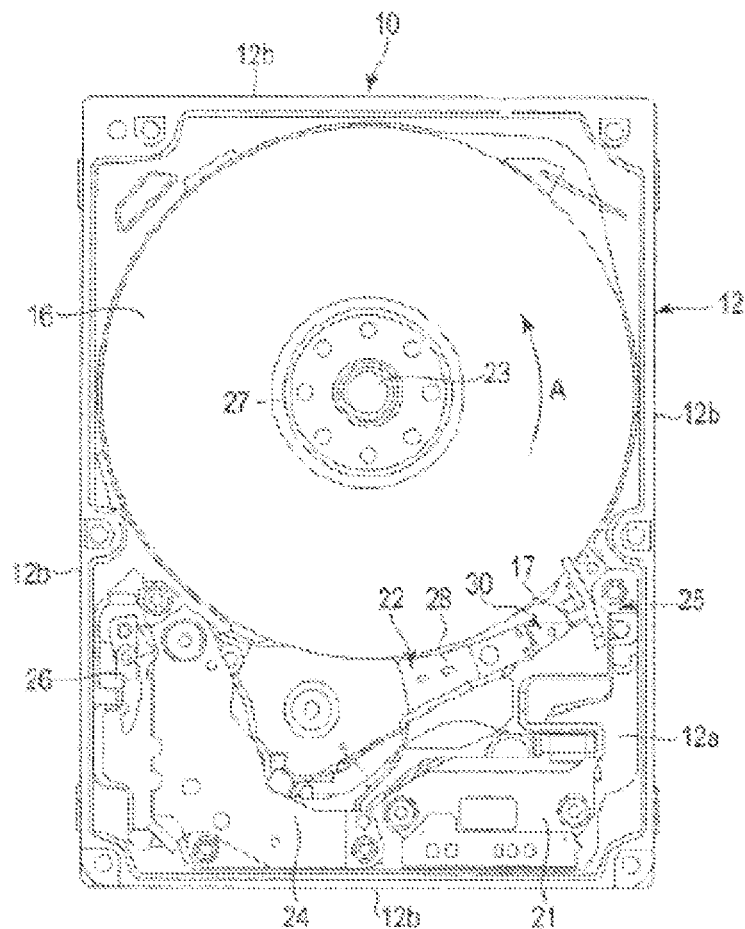
FIG. 1 is a plan view showing the internal structure of a hard disk drive (HDD) according to an embodiment.

Various embodiments will be described hereinafter with reference to the accompanying drawings. In general, according to one embodiment, a head gimbal assembly comprises a suspension, a gimbal portion provided in the suspension, and a magnetic head supported on the gimbal portion. The magnetic head comprises a slider which comprises an air bearing surface including a pair of side edges, a pair of side surfaces along the pair of side edges of the air bearing surface, a leading-side end surface, and a trailing-side end surface, and a head portion provided in the slider and configured to write and read data. The slider comprises a leading-side step portion on a leading-side end portion of the air bearing surface, a trailing-side step portion on a trailing-side end portion of the air bearing surface and including the head portion, a deep groove which is formed between the leading-side step portion and the trailing-side step portion and is open to the air bearing surface and the pair of side surfaces, and at least a pair of capturing grooves which is formed on a bottom surface of the deep groove, and the pair of capturing grooves is provided along the pair of side surfaces and is disposed with a gap from the pair of side surfaces.

The disclosure is merely an example, and appropriate changes performed by those skilled in the art within the gist of the present invention and matters easily conceived by those skilled in the art are included in the scope of the present invention. In addition, in order to make the explanation clearer, the drawings may be schematically represented in terms of a width, a thickness, a shape, or the like of each part as compared with actual aspects. However, it is only an example, and does not limit the interpretation of the present invention. Moreover, in the present specification and each drawing, the same reference numerals are assigned to the same elements as those described above with reference to the preceding drawings, and detailed explanation thereof may be appropriately omitted.

First Embodiment

A hard disk drive (HDD) according to an embodiment will be described in detail as an example of a magnetic disk device. FIG. 1 is a plan view showing the internal structure of an HDD according to a first embodiment.

As shown in FIG. 1, the HDD has a housing 10. The housing 10 includes a rectangular box-shaped base 12 having an upper end opening and a top cover (not shown) which closes an upper end opening of the base 12. The base 12 includes a rectangular bottom wall 12a and side walls 12b which are erected along a peripheral edge of the bottom wall 12a.

In the housing 10, there are provided one or a plurality of magnetic disks 16 as a recording medium, and a spindle motor 23 as a driving unit for supporting and rotating the magnetic disk 16. The magnetic disk 16 is coaxially fitted to a hub (not shown) of the spindle motor 23 and clamped by a clamp spring 27 to be fixed to the hub. The magnetic disk 16 is rotated at a predetermined speed in a direction of an arrow A by the spindle motor 23.

A plurality of magnetic heads 17 for writing/reading data to/from the magnetic disk 16, and a carriage assembly 22 movably supporting the magnetic head 17 with respect to the magnetic disk 16 are provided in the housing 10. In the housing 10, there are provided a voice coil motor (hereinafter, referred to as VCM) 24 which rotates and positions the carriage assembly 22, a ramp load mechanism 25 which holds the magnetic head 17 at an unload position separated from the magnetic disk 16 when the magnetic head 17 moves to an outermost periphery of the magnetic disk 16, a latch mechanism 26 which holds the carriage assembly 22 at a retreated position when an impact or the like acts on the HDD, and a substrate unit 21 having a conversion connector or the like.

A printed circuit board (not shown) is screwed to an outer surface of the bottom wall 12a of the base 12. The printed circuit board controls operations of the VCM 24 and the magnetic head 17 via the substrate unit 21 and controls an operation of the spindle motor 18.

Figure 2:
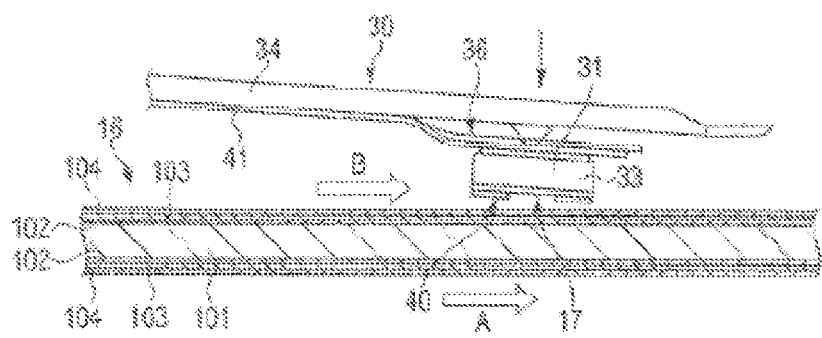
FIG. 2 is an enlarged side view showing a magnetic disk and a head gimbal assembly.

FIG. 2 schematically shows the magnetic head and the magnetic disk in a flying state. As shown in FIGS. 1 and 2, for example, the magnetic disk 16 has a substrate 101 made of a nonmagnetic material formed in a disk shape having a diameter of approximately 2.5 inches (6.35 cm). On each of both surfaces of the substrate 101, a soft magnetic layer 102 formed of a material exhibiting soft magnetic characteristics as an underlayer, a magnetic recording layer 103 provided as an upper layer portion thereof, and a protective film layer 104 provided as an upper layer thereof are laminated in this order.

The carriage assembly 22 includes a plurality of arms 28 and head gimbal assemblies 30 extending from respective arms 28. Each head gimbal assembly 30 includes an elongated leaf spring-shaped suspension 34, a flexure 41 as a wiring member provided on the suspension 34, and the magnetic head 17. The magnetic head 17 is supported by a tip end portion of the suspension 34 via the gimbal portion 36 of the flexure 41.

As shown in FIG. 2, the magnetic head 17 is configured as a flying type head, and includes a slider 31 formed in a substantially rectangular parallelepiped shape and a head portion 33 formed on an end portion on an outflow end (trailing) side of the slider 31. The slider 31 includes an air bearing surface (ABS) 40 facing the surface of the magnetic disk 16. The magnetic head 17 flies due to an air flow B generated between a surface of the magnetic disk 16 and the ABS 40 of the slider 31 by a rotation of the magnetic disk 16. The direction of the air flow B coincides with a rotation direction A of the magnetic disk 16.

Figure 3:
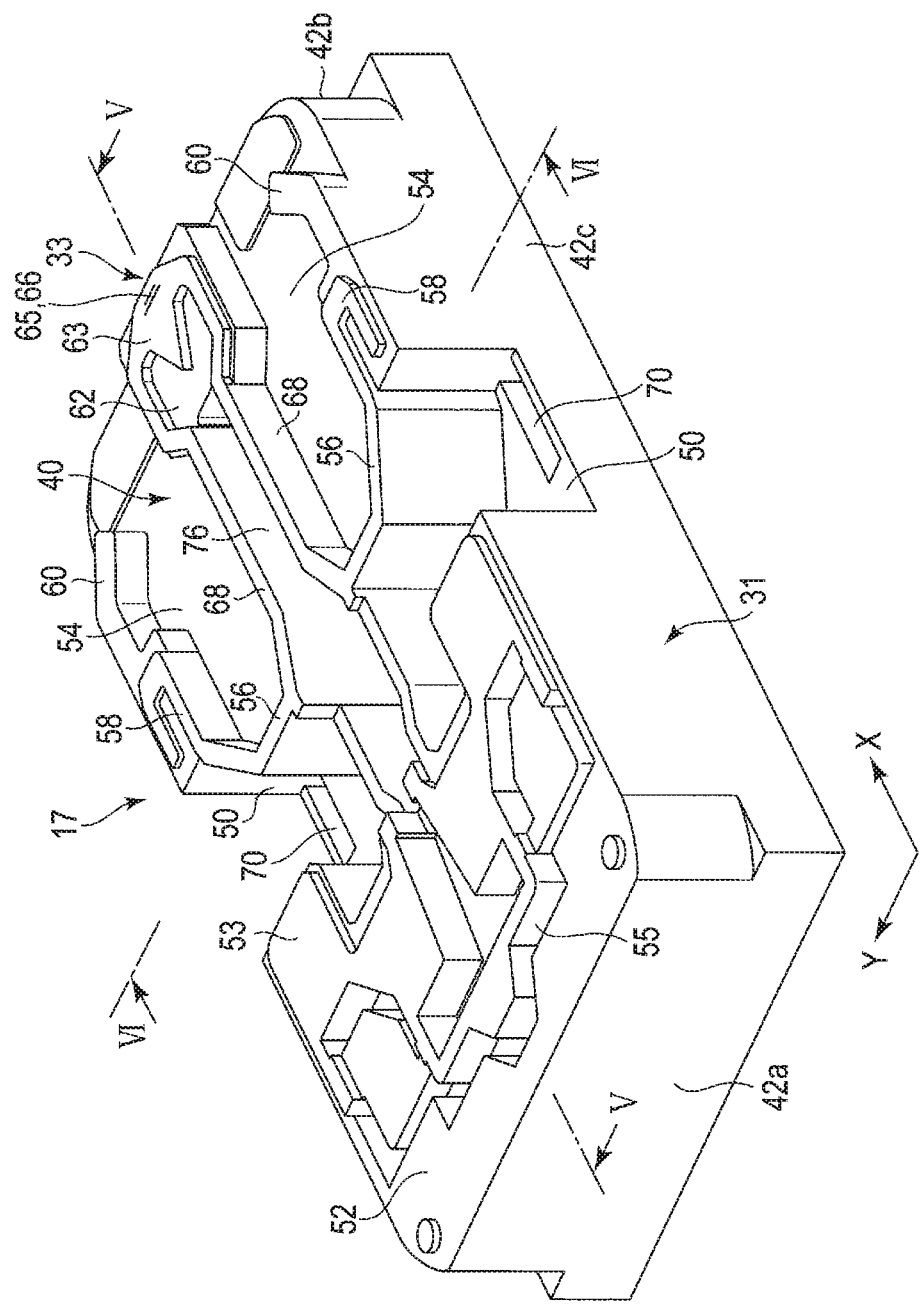
FIG. 3 is a perspective view showing an air bearing surface (ABS) side of a magnetic head.

Next, a configuration of the magnetic head 17 will be described in detail. FIG. 3 is a perspective view showing the slider of the magnetic head, and FIG. 4 is a plan view showing the ABS side of the slider.

Figure 4:
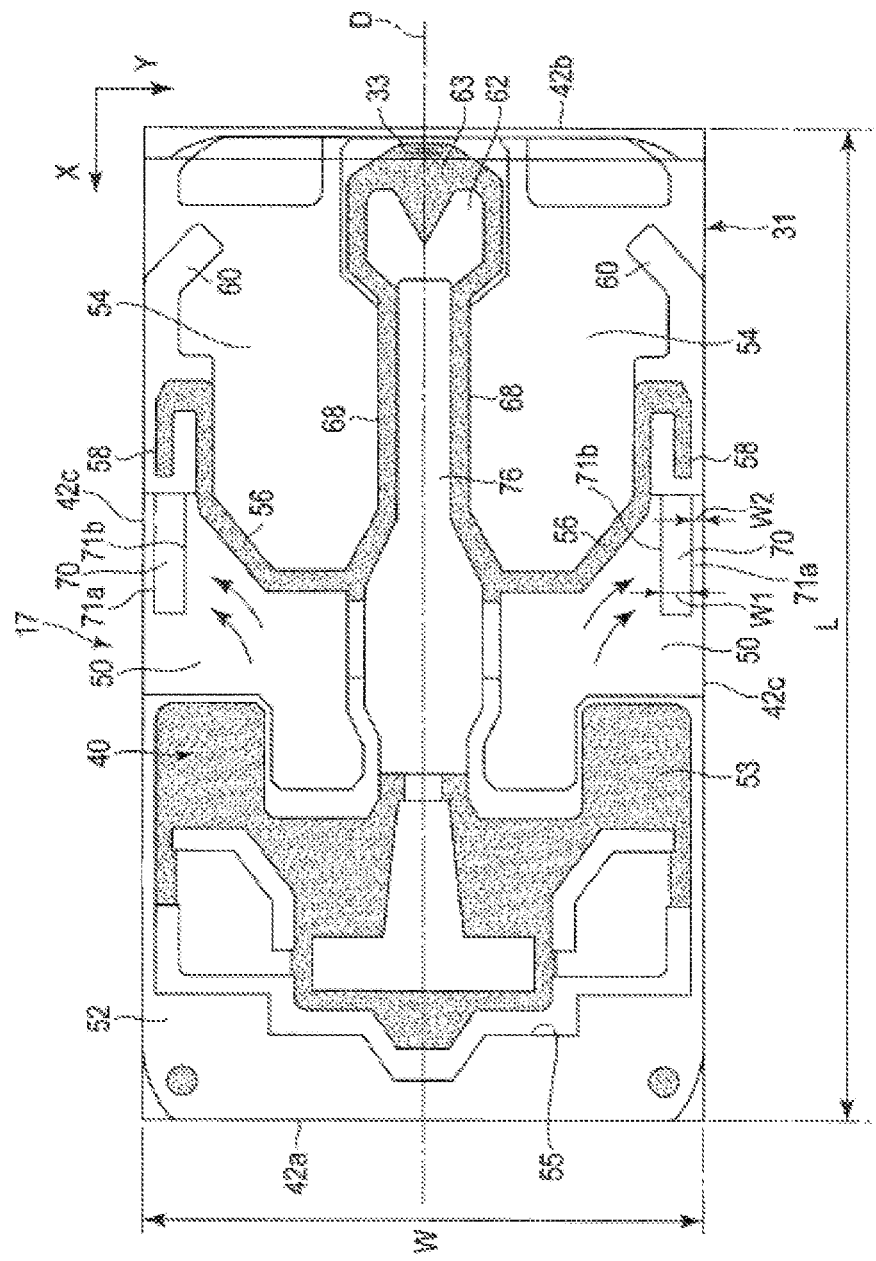
FIG. 4 is a plan view showing the ABS side of the magnetic head.

As shown in FIGS. 3 and 4, the slider 31 of the magnetic head 17 is formed in a substantially rectangular parallelepiped shape, and includes the rectangular air bearing surface (disk facing surface) (ABS) 40 facing the surface of the magnetic disk 16, an inflow-side end surface (a leading-side end surface) 42a extending orthogonally to the ABS 40, an outflow-side end surface (a trailing-side end surface) 42b extending orthogonally to the ABS 40, and a pair of side surfaces (side portions) 42c which is orthogonal to the ABS 40 and extends between the inflow-side end surface 42a and the outflow-side end surface 42b.

A longitudinal direction of the ABS 40 is defined as a first direction X, and a width direction perpendicular to the first direction X is defined as a second direction Y. In an example, the slider 42 has a length L in the first direction X of 1.25 mm or less, for example, 1.235 mm, a width W in the second direction Y of 1.0 mm or less, for example 0.7 mm, and a thickness T1 of 0.23 to 0.3 mm, and is configured as a so-called femto-slider.

Figure 5:
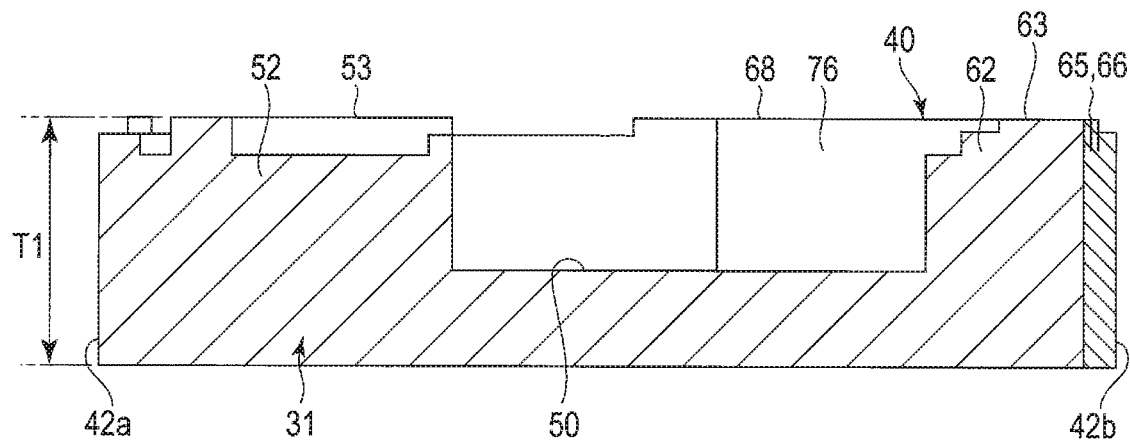
FIG. 5 is a sectional view of the magnetic head taken along line V-V of FIG. 3.
Figure 6:
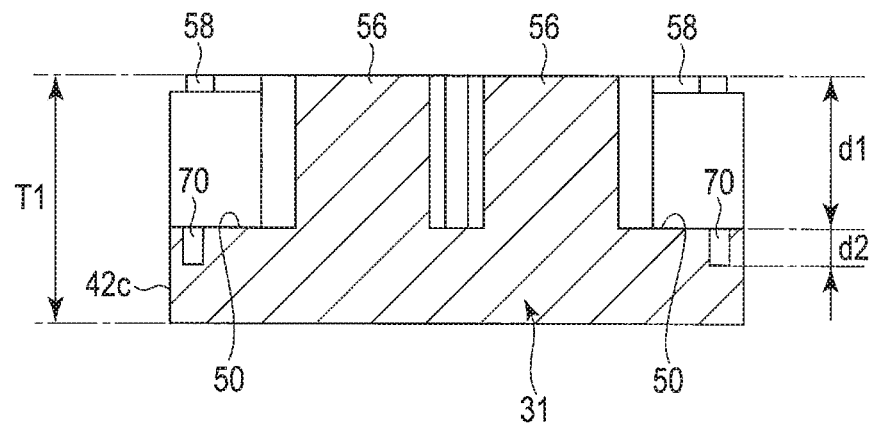
FIG. 6 is a sectional view of the magnetic head taken along line VI-VI of FIG. 3.

FIG. 5 is a longitudinal sectional view of the slider taken along line V-V of FIG. 3 and FIG. 6 is a cross sectional view of the slider taken along line VI-VI of FIG. 3.

As shown in FIGS. 3 to 5, a strip-shaped negative pressure generating grooves (deep grooves) 50 extending over the entire length in the second direction Y is formed substantially in a center portion in the first direction X of the ABS 40. The negative pressure generating groove 50 has a flat bottom surface and is open to the side surfaces 42c of the slider 31. For example, when the thickness T1 of the slider 31 is 0.23 mm, a depth d1 (see FIG. 6) of the negative pressure generating groove 50 is set to 1 to 5 μm, for example, 3 μm. The negative pressure generating groove 50 is provided, and thus, it is possible to generate a negative pressure at the center portion of the ABS 40 at all yaw angles realized by the HDD.

A substantially rectangular leading step 52 is formed on the leading-side end portion of the ABS 40. The leading step 52 protrudes from the bottom surface of the negative pressure generating groove 50 and is positioned on an inflow side of the negative pressure generating groove 50 with respect to the air flow B.

In order to maintain a pitch angle of the magnetic head 17, a leading pad (inflow-side pressure generating surface) 53 supporting the slider 31 by an air film protrudes from the leading step 52. The leading pad 53 is formed in an M shape opening at a plurality of positions toward the inflow side. An upper surface of the leading pad 53 configures the uppermost surface of the slider 31 and configures a part of the ABS 40. A negative pressure generating groove 55 is formed at a position slightly shifted to an outflow side from the inflow end of the leading step 52.

As shown in FIGS. 3 to 5, a negative pressure cavity 54 configured of a recess is formed from the substantially central portion of the ABS 40 to the outflow-side end surface 42b. The negative pressure cavity 54 is positioned on the outflow end side of the negative pressure generating groove 50 and is open toward the outflow-side end surface 42b. The negative pressure cavity 54 is shallower than the negative pressure generating groove 50, that is, the negative pressure cavity 54 is formed at a position higher than the bottom surface of the negative pressure generating groove 50. A depth of the negative pressure cavity 54 is formed to be 500 to 1500 nm, for example, 1000 nm. The negative pressure cavity 54 is provided, and thus, it is possible to generate a negative pressure at the center portion of the ABS 40 at all yaw angles realized by the HDD.

In the ABS 40, a rib-shaped intermediate step 56, a pair of side steps 58, and a pair of skirts 60 are formed so as to surround the negative pressure cavity 54. The intermediate step 56 is positioned between the negative pressure generating groove 50 and the negative pressure cavity 54 and extends between both side edges of the ABS 40 in the second direction Y. The intermediate step 56 protrudes from a bottom surface the negative pressure cavity 54 and is positioned on the inflow side of the negative pressure cavity 54 with respect to the air flow B.

The pair of side steps 58 is formed along each side edge of the ABS 40 and extends from the intermediate step 56 to the outflow end side of the ABS 40. The side steps 58 protrude from the bottom surface of the negative pressure cavity 54.

The pair of skirts 60 is formed along each side edge (side surface 42c) of the ABS 40 and each skirt 60 extends from the side step 58 in the first direction X to the vicinity of the outflow-side end surface 42b of the ABS 40. Each skirt 60 is formed to protrude from the bottom surface of the negative pressure cavity 54 and is formed to be lower than the side step 58.

The intermediate step 56, the pair of side steps 58, and the pair of skirts 60 are formed in a substantially U shape which is closed on an upstream side and is open toward a downstream side as a whole. The negative pressure cavity 54 is defined by the intermediate step 56, the pair of side steps 58, and the pair of skirts 60.

As shown in FIGS. 3 to 6, the slider 31 includes a trailing step 62 formed at an outflow-side end portion of the ABS 40 in the direction of the air flow B. The trailing step 62 protrudes from the bottom surface of the negative pressure cavity 54, and is formed such that a protruding height thereof is the same as that of the leading step 52. The trailing step 62 is positioned at the substantially center in the second direction Y of the ABS 40. A trailing pad (outflow-side pressure generating surface) 63 for supporting the slider 31 by an air film protrudes from an upper surface of the trailing step 62.

The trailing pad 63 is provided with a gap on the inflow side from the outflow-side end surface of the trailing step 62, here, the outflow-side end surface 42b of the slider 31. The trailing pad 63 is formed at the same height level as the leading pad 53, the intermediate step 56, and the side step 58 and becomes the uppermost surface of the slider 31 so as to configure a portion of the ABS 40.

The head portion 33 of the magnetic head 17 includes a recording element 65 and a reading element 66 for recording/reading information to/from the magnetic disk 16. The recording element 65 and the reading element 66 are embedded into a downstream-side end portion of the slider 31 in the direction of the air flow B, here, into the trailing step 62. Tip end portions of the recording element 65 and the reading element 66 are exposed to the ABS 40 at the position of the trailing pad 63.

The ABS 40 of the slider 31 has a pair of elongated center rails 68 extending from the intermediate step 56 to the trailing step 62 in the first direction X. The pair of center rails 68 is positioned on both sides of a central axis D of the slider 31 and faces each other with a gap in the second direction Y. A height of each center rail 68 from the bottom surface of the negative pressure cavity 54 is the same as the height of each of the intermediate step 56 and the trailing pad 63. A guide groove 76 for guiding the air flow to the trailing step 62 and the trailing pad 63 is formed between the pair of center rails 62. The guide groove 76 is formed along the center axis D and passes through the negative pressure generating groove 50 to further extend to the leading step 52.

The above-described leading step 52 configures an inflow-side step portion of the slider 31, and the intermediate step 56, the side steps 58, and the trailing step 62 configure an outflow-side step portion of the slider 31. The negative pressure generating groove 50 is provided between the inflow-side step portion and the outflow-side step portion.

In the present embodiment, a pair of capturing grooves (deepest grooves) 70 is formed on the bottom surface of the negative pressure generating groove 50. The pair of capturing grooves 70 is provided in the vicinities of both side surfaces 42c of the slider 31. Each capturing groove 70 extends in the first direction X from a trailing-side step portion (here, the side step 58) which is the downstream side with respect to the air flow B toward the inflow-side (leading-side) step portions 52 and 53. For example, each of the capturing grooves 70 is formed in an elongated rectangular shape or a stripe shape having a constant width W1. That is, the capturing groove 70 includes one side edge 71a extending substantially parallel to the side surface 42c and the other side edge 71b extending parallel to the one side edge 71a with a gap from the one side edge 71a. Each capturing groove 70 is disposed adjacent to the side surfaces 42c and at a slight distance W2 from the side surfaces 42c. For example, the capturing groove 70 is separated from the inflow-side step portions 52 and 53 by a predetermined distance. The width W1 of the capturing groove 70 is formed narrower than a width of the side step 58. Accordingly, at least both sides of the capturing groove 70 in the second direction Y are interposed by the bottom surface of the negative pressure generating groove 50. In the present embodiment, except for the side step 58 side, a periphery of the capturing groove 70 is surrounded by the bottom surface of the negative pressure generating groove 50. In an example, the capturing groove 70 has a depth d2 of about 1 μm, for example. For example, the capturing groove 70 is formed such that the width W1 thereof is approximately 30 μm. For example, the distance W2 between the side edge 71a of the capturing groove 70 and the side surface (side edge) 42c of the slider 31 is approximately 10 μm.

Figure 7A:
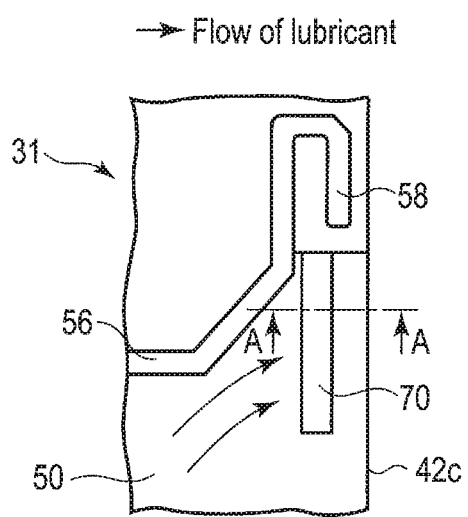
FIG. 7A is a plan view schematically showing a capturing groove portion of the magnetic head.
Figure 7B:
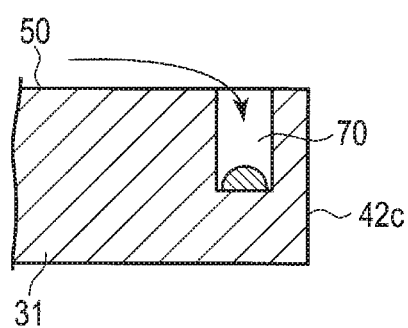
FIG. 7B is a sectional view of the capturing groove portion taken along the line A-A of FIG. 7A.

According to the magnetic head 17 of the head gimbal assembly 30 configured as described above, at least a pair of capturing grooves 70 is provided on the bottom surface of the negative pressure generating groove 50 of the ABS 40. Accordingly, as schematically shown in FIGS. 7A and 7B, a lubricant or liquid contamination adhering to the center portion of the magnetic head 17 (slider 31) is captured by the capturing groove 70 and stored in the capturing groove 70 in a process of flowing through the negative pressure generating groove 50 to the downstream side, that is, to the side surfaces 42c side. Therefore, it is possible to prevent the lubricant or the liquid contamination adhering to the magnetic head 17 from flowing from the side surfaces 42c of the slider 31 to the magnetic head outflow side and falling onto the magnetic disk 16. Accordingly, it possible to suppress failure and characteristic deterioration of the magnetic head 17 and the magnetic disk 16 caused by contamination and to improve the reliability of the magnetic disk device.

From the above, according to the first embodiment, the head gimbal assembly and the magnetic disk device are obtained, in which the failure caused by contamination decreases and reliability is improved.

Dimensions such as the shape, width, length, or depth of the capturing groove 70 are not limited to the present embodiment, and various selections are possible.

Next, the magnetic heads of the HDD according to other embodiments will be described. In the other embodiments to be described below, the same reference numerals are assigned to the same parts as those in the above-described first embodiment, detailed descriptions thereof are omitted, and the parts different from these of the first embodiment will be described in detail.

Second Embodiment

Figure 8:
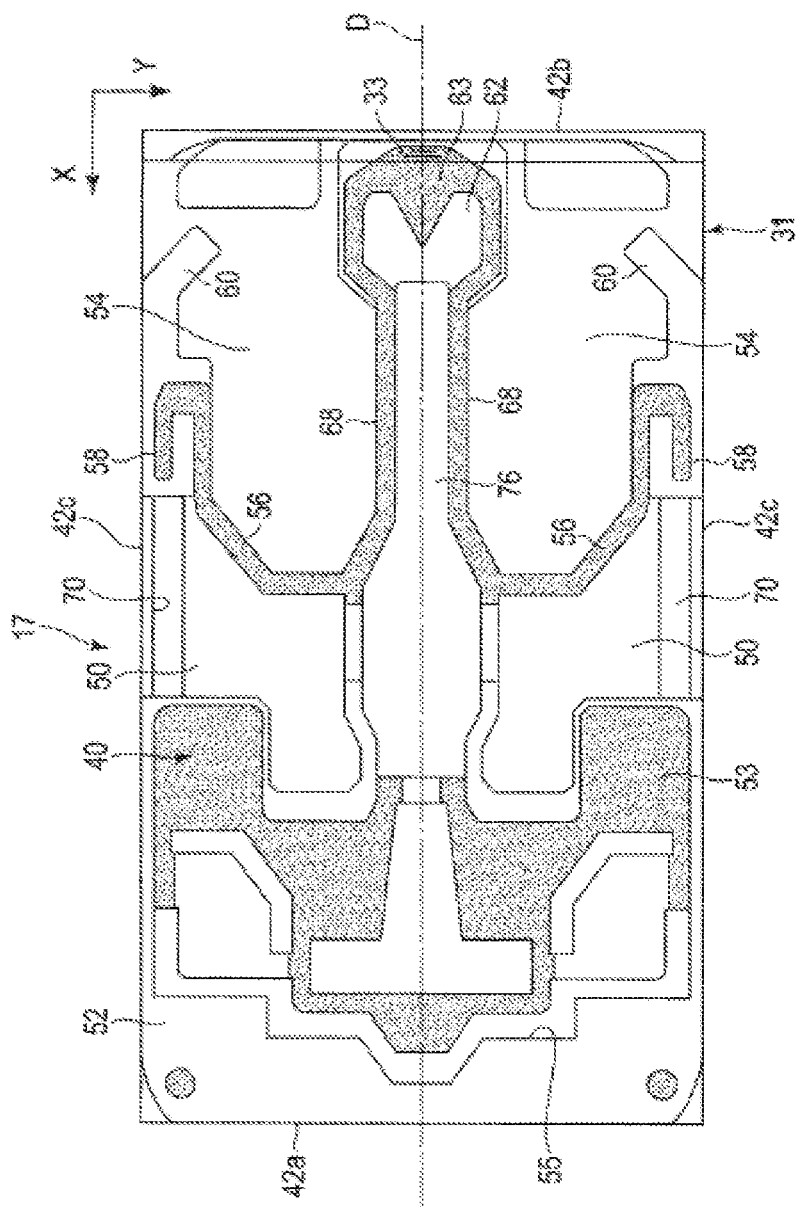
FIG. 8 is a plan view showing an ABS side of a magnetic head in an HDD according to a second embodiment.

FIG. 8 is a plan view showing an ABS side of a magnetic head in an HDD according to a second embodiment.

As shown in FIG. 8, according to the second embodiment, a capturing groove 70 provided on a bottom surface of a negative pressure generating groove 50 of a slider 31 extends over the entire width of the negative pressure generating groove 50. That is, a pair of capturing grooves 70 is provided in the vicinities of both side surfaces 42c of the slider 31. Each capturing groove 70 extends in a first direction X from an outflow-side step portion (here, side step 58) which is a downstream side with respect to an air flow B to the inflow-side step portions 52 and 53. For example, each of the capturing grooves 70 is formed in an elongated rectangular shape or a stripe shape having a constant width. Each capturing groove 70 is disposed adjacent to the side surfaces 42c and with a slight gap from the side surfaces 42c. The width of the capturing groove 70 is formed narrower than a width of the side step 58. Accordingly, both sides of the capturing groove 70 in a second direction Y are interposed by the bottom surface of the negative pressure generating groove 50.

Other configurations of the magnetic head 17 are the same as those of the magnetic head 17 of the above-described first embodiment.

According to the second embodiment configured as described above, the capturing grooves 70 are provided, and thus, it is possible to prevent a lubricant or liquid contamination adhering to the magnetic head 17 from flowing from the side surfaces 42c of the slider 31 to a magnetic head outflow side and falling onto a magnetic disk 16. In addition, each of the capturing grooves 70 is formed over the entire width of the negative pressure generating groove 50, and thus, it is possible to more reliably capture the lubricant or the liquid contamination so as to prevent an outflow thereof.

Third Embodiment

Figure 9:
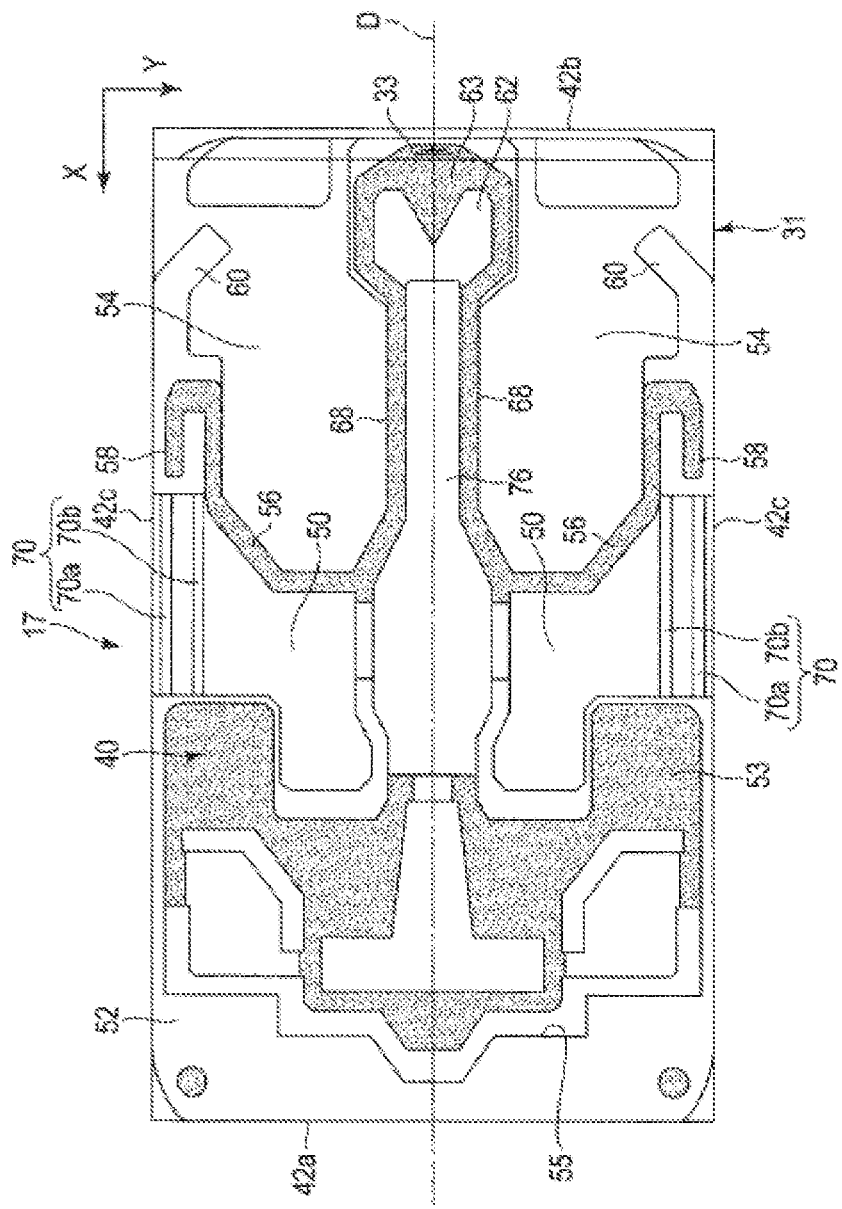
FIG. 9 is a plan view showing an ABS side of a magnetic head in an HDD according to a third embodiment.

FIG. 9 is a plan view showing an ABS side of a magnetic head in an HDD according to a third embodiment.

As shown in FIG. 9, according to the third embodiment, a plurality of capturing grooves 70 are provided in each of both sides of a bottom surface of a negative pressure generating groove 50 of a slider 31. In one example, two pairs of capturing grooves 70a and 70b are provided for each pair. On each side surface 42c side, the two capturing grooves 70a and 70b are provided adjacent to the side surface 42c. The two capturing grooves 70a and 70b are arranged in parallel to each other and with a gap therebetween. Each of the capturing grooves 70a and 70b extends in a first direction X from an outflow-side step portion (here, side step 58) which is a downstream side with respect to an air flow B to inflow-side step portions 52 and 53. For example, each of the capturing grooves 70a and 70b is formed in an elongated rectangular shape or a stripe shape having a constant width. In the two capturing grooves 70a and 70b, the capturing groove 70a positioned on the side surface 42c side is disposed adjacent to the side surfaces 42c and with a slight gap from the side surfaces 42c. The width of each of the capturing grooves 70a and 70b is formed narrower than a width of the side step 58. Accordingly, both sides of each of the capturing grooves 70a and 70b in a second direction Y are interposed by the bottom surface of the negative pressure generating groove 50.

Other configurations of the magnetic head 17 are the same as those of the magnetic head 17 of the above-described first embodiment.

In the third embodiment configured as described above, operational effects similar to those of the above-described first embodiment can be obtained. In addition, the plurality of capturing grooves are provided, and thus, it is possible to more reliably capture lubricant or liquid contamination adhering to the magnetic head 17 so as to prevent an outflow thereof.

With respect to the number of the capturing grooves 70, a plurality of capturing grooves 70 may be provided on only one side surface 42c side, and a single capturing groove 70 may be provided on the other side surface side. In addition, the number of the capturing grooves 70 provided on each side surface side is not limited to 2 and may be 3 or more.

Hereinafter, a plurality of modifications will be described.

Figure 10:
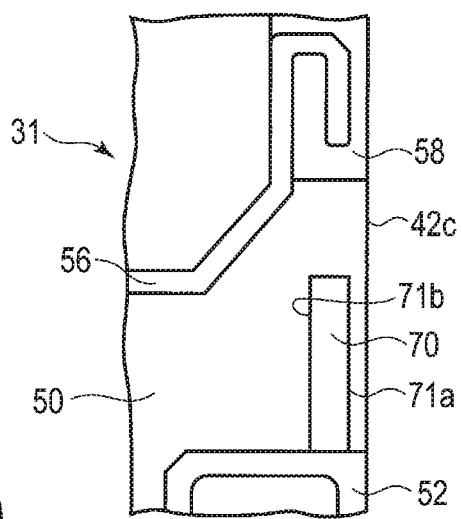
FIG. 10 is a plan view schematically showing a capturing groove portion of a magnetic head according to a first modification.

As in a first modification shown in FIG. 10, a capturing groove 70 may be formed so as to extend from an upstream-side step portion 53 to the vicinity of a downstream-side step portion 58 on a bottom surface of a negative pressure generating groove 50.

Figure 11:
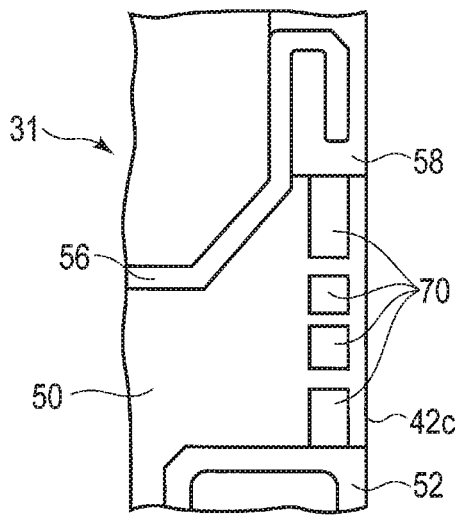
FIG. 11 is a plan view schematically showing a capturing groove portion of a magnetic head according to a second modification.

As in a second modification shown in FIG. 11, a capturing groove 70 is not limited to a continuous groove, and may be formed by intermittently formed grooves, that is, grooves separated at a plurality of locations in a longitudinal direction.

Figure 12:
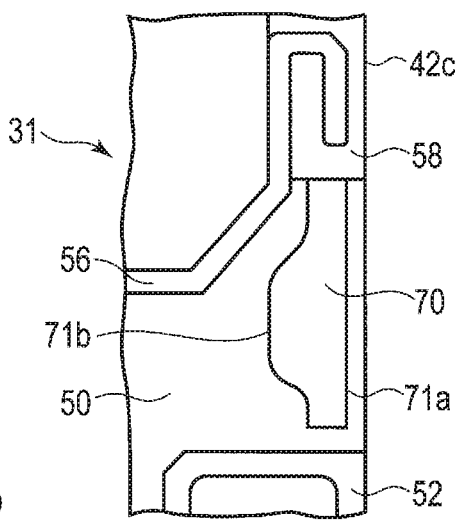
FIG. 12 is a plan view schematically showing a capturing groove portion of a magnetic head according to a third modification.

The capturing groove 70 is not limited to a straight groove having a constant width. As in a third modification shown in FIG. 12, a capturing groove 70 may have a shape in which at least a portion of the other side edge 71b is curved or a shape having a non-uniform width.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, the slider of the magnetic head is not limited to the femto-slider. That is, the slider can be applied to a pico-slider, a pemto-slider, or a slider having a larger size. In the slider, the shapes, dimensions, or the like of the trailing step, trailing pad, and other portions can be changed as necessary. In a disk drive, the size of the magnetic disk is not limited to 2.5 inches, but the magnetic disk may have other sizes. The number of magnetic disks is not limited to two and may be one or three or more, and the number of head gimbal assemblies may increase or decrease according to the number of the installed magnetic disks. The material and dimensions used for the head gimbal assembly are not limited to the embodiments, and various modifications can be made as necessary.

What is claimed is:

1. A head gimbal assembly comprising:
a suspension;
a gimbal portion provided at the suspension; and a magnetic head supported on the gimbal portion,
wherein the magnetic head comprises
a slider which comprises an air bearing surface including a pair of side edges, a pair of side surfaces along the pair of side edges of the air bearing surface, a leading-side end surface, and a trailing-side end surface, and
a head portion provided in the slider and configured to write and read data, and
wherein the slider comprises a leading-side step portion on a leading-side end portion of the air bearing surface, a trailing-side step portion on a trailing-side end portion of the air bearing surface and including the head portion, a deep groove which is formed between the leading-side step portion and the trailing-side step portion and is open to the air bearing surface and the pair of side surfaces, and at least a pair of capturing grooves which is formed on a bottom surface of the deep groove, and the pair of capturing grooves is provided along the pair of side surfaces and is disposed with a gap from the pair of side surfaces, each of the capturing grooves intermittently extends from the trailing-side step portion to the leading-side step portion.

2. The head gimbal assembly of claim 1, wherein
each of the capturing grooves comprises one side edge which extends to be parallel to the side surface of the slider and an other side edge which faces the one side edge with a gap from the one side edge.

3. The head gimbal assembly of claim 2, wherein
the other side edge extends to be parallel to the one side edge.

4. A magnetic disk device comprising:
a disk-shaped recording medium which is rotatably provided;
a head gimbal assembly which comprises a suspension, a gimbal portion provided in the suspension, and a magnetic head supported on the gimbal portion,
wherein a slider which comprises an air bearing surface including a pair of side edges, a pair of side surfaces along the pair of side edges of the air bearing surface, a leading-side end surface, and a trailing-side end surface, and a head portion provided in the slider and configured to write and read data, and
wherein the slider comprises a leading-side step portion on a leading-side end portion of the air bearing surface, a trailing-side step portion on a trailing-side end portion of the air bearing surface and including the head portion, a deep groove which is formed between the leading-side step portion and the trailing-side step portion and is open to the air bearing surface and the pair of side surfaces, and at least a pair of capturing grooves which is formed on a bottom surface of the deep groove, and the pair of capturing grooves is provided along the pair of side surfaces and is disposed with a gap from the pair of side surfaces, each of the capturing grooves intermittently extends from the trailing-side step portion to the leading-side step portion.

5. The magnetic disk device of claim 4, wherein
each of the capturing grooves comprises one side edge which extends to be parallel to the side surface of the slider and an other side edge which faces the one side edge with a gap from the one side edge.

6. The magnetic disk device of claim 5, wherein
the other side edge extends to be parallel to the one side edge.

* * * * *